US010573135B2

(12) United States Patent
Hutchings et al.

(10) Patent No.: US 10,573,135 B2
(45) Date of Patent: Feb. 25, 2020

(54) APPARATUS, SYSTEM, AND METHOD FOR SELF-SERVICE SHOPPING

(71) Applicant: Digitized Concepts, LLC, Sealy, TX (US)

(72) Inventors: Beverly B. Hutchings, Sealy, TX (US); Gregory Hutchings, Sealy, TX (US)

(73) Assignee: Digitized Concepts, LLC, Sealy, TX (US)

( * ) Notice: Subject to any disclaimer, the term of this patent is extended or adjusted under 35 U.S.C. 154(b) by 832 days.

(21) Appl. No.: 15/026,891

(22) PCT Filed: Oct. 3, 2014

(86) PCT No.: PCT/US2014/059141
§ 371 (c)(1),
(2) Date: Apr. 1, 2016

(87) PCT Pub. No.: WO2015/051303
PCT Pub. Date: Apr. 9, 2015

(65) Prior Publication Data
US 2016/0300455 A1     Oct. 13, 2016

Related U.S. Application Data

(60) Provisional application No. 61/961,051, filed on Oct. 3, 2013.

(51) Int. Cl.
| | | |
|---|---|---|
| *G06Q 30/00* | (2012.01) | |
| *G07G 1/00* | (2006.01) | |
| *G06Q 20/20* | (2012.01) | |
| *G06Q 30/06* | (2012.01) | |
| *G06K 19/06* | (2006.01) | |
| *G06Q 20/10* | (2012.01) | |
| *G06Q 20/32* | (2012.01) | |

(52) U.S. Cl.
CPC ....... *G07G 1/009* (2013.01); *G06K 19/06037* (2013.01); *G06Q 20/102* (2013.01); *G06Q 20/20* (2013.01); *G06Q 20/208* (2013.01); *G06Q 20/3276* (2013.01); *G06Q 20/3278* (2013.01); *G06Q 30/06* (2013.01); *G06Q 30/0639* (2013.01); *G07G 1/0054* (2013.01); *G07G 1/0081* (2013.01)

(58) Field of Classification Search
CPC .................................................. G06Q 30/06–08
USPC ................................................. 705/26.1–27.2
See application file for complete search history.

(56) References Cited

U.S. PATENT DOCUMENTS

| | | |
|---|---|---|
| 4,071,710 A | 1/1978 | Gogulski |
| 5,418,354 A | 5/1995 | Halling et al. |
| 6,659,346 B1 | 12/2003 | Williams |
| 7,934,647 B1 | 5/2011 | Mims et al. |

(Continued)

OTHER PUBLICATIONS

PCT/US2014/059141 International Search Report and Written Opinion dated Jan. 15, 2015 (12 p.).

(Continued)

*Primary Examiner* — Ethan D Civan
(74) *Attorney, Agent, or Firm* — Conley Rose, P.C.

(57) ABSTRACT

Disclosed is a shopping system wherein a self-contained shopping vehicle allows for both physical and electronic interface by the consumer with the shopping vehicle to both execute and complete a shopping transaction at the shopping vehicle of the shopping system.

33 Claims, 6 Drawing Sheets

(56) References Cited

U.S. PATENT DOCUMENTS

| | | | |
|---|---|---|---|
| 8,418,919 B1 | 4/2013 | Beyda | |
| 2002/0194074 A1* | 12/2002 | Jacobs | G07G 1/01 |
| | | | 705/16 |
| 2007/0125848 A1 | 6/2007 | Bannetto Piamenta | |
| 2008/0296392 A1 | 12/2008 | Connell, II et al. | |
| 2009/0106085 A1* | 4/2009 | Raimbeault | G06Q 20/208 |
| | | | 705/14.44 |
| 2012/0284132 A1 | 11/2012 | Kim et al. | |
| 2013/0103486 A1 | 4/2013 | Hess et al. | |
| 2014/0058946 A1* | 2/2014 | Paranjape | G07G 1/0081 |
| | | | 705/44 |
| 2014/0214596 A1* | 7/2014 | Acker, Jr. | G06Q 30/0633 |
| | | | 705/26.8 |

OTHER PUBLICATIONS

PCT/US2014/059141 Response to Written Opinion dated Jan. 15, 2015 and Article 19 Amendments; Response filed Mar. 16, 2015 (30 p.).

Bonsor, Kevin, et al., "How RFID Works," http://electronics.howstuffworks.com/gadgets/high-tech-gadgets/rfid.htm (accessed Aug. 6, 2014) (1 p.).

\* cited by examiner

PRIOR ART

APPARATUS, SYSTEM, AND METHOD FOR SELF-SERVICE SHOPPING

CROSS-REFERENCE TO RELATED APPLICATIONS

This application is a 35 U.S.C. § 371 national stage application of PCT/US2014/059141 filed Oct. 3, 2014 and entitled "Apparatus, System, and Method for Self-Service Shopping," which claims benefit of U.S. provisional patent application Ser. No. 61/961,051 filed Oct. 3, 2013 and entitled "Electronic Shopping Cart Scanner," both of which are hereby incorporated herein by reference in their entirety for all purposes.

STATEMENT REGARDING FEDERALLY SPONSORED RESEARCH OR DEVELOPMENT

Not applicable.

BACKGROUND

This disclosure relates generally to shopping at physical locations. More particularly, it relates to an apparatus and system for assisting a user or consumer while shopping. Still more particularly, this disclosure relates to apparatus and system for self-service shopping at physical locations.

Shopping for merchandise at a shopping location involves locating and collecting items of merchandise and then moving to a check-out station. At the check-out station the items are handled again to be tallied and possibly weighed to produce a list of items and a total cost for the transaction. Payment is made and ownership for the merchandise is transferred to the consumer at the check-out station, completing the shopping transaction. However, at various times, a consumer must wait in a line with other consumers before reaching a check-out station, causing an unwanted expenditure of time. Apparatus, systems, and methods are proposed herein to allow a user or a consumer to shop more efficiently or to perform more of the tasks associated with shopping and completing the shopping transaction.

SUMMARY

In certain disclosed embodiments, a consumer-operable shopping system allows a consumer to physically and electronically interface with a self-contained shopping vehicle so that the consumer can gather desired items of merchandise and complete an accurate transaction for purchase of the items of merchandise at the self-contained shopping vehicle. The self-contained shopping vehicle can be apart from a prescribed check-out location such that the transaction can be completed free of the prescribed check-out location.

In some embodiments, a shopping system for enabling a shopping transaction at a shopping location includes a first portable shopping receptacle, a shopping scanner configured to read a merchandise identification symbol associated with an item of merchandise, to process a method of payment for the shopping transaction, and to provide confirmation of completion of the shopping transaction, and an item detection sensor coupled to the first portable shopping receptacle for movement through the shopping location and configured to detect physical presence of the item of merchandise when the item of merchandise is disposed in the first portable shopping receptacle, wherein the shopping scanner is further configured to receive indication of the physical presence of the item of merchandise in the first portable shopping receptacle from the item detection sensor.

Thus, embodiments described herein include a combination of features and characteristics intended to address various shortcomings associated with certain prior devices, systems, and methods. The various features and characteristics described above, as well as others, will be readily apparent to those of ordinary skill in the art upon reading the following detailed description, and by referring to the accompanying drawings.

BRIEF DESCRIPTION OF THE DRAWINGS

For a detailed description of the disclosed embodiments, reference will now be made to the accompanying drawings in which.

NOTATION AND NOMENCLATURE

The following description is exemplary of certain embodiments of the disclosure. One of ordinary skill in the art will understand that the following description has broad application, and the discussion of any embodiment is meant to be exemplary of that embodiment, and is not intended to suggest in any way that the scope of the disclosure, including the claims, is limited to that embodiment.

The drawing figures are not necessarily to scale. Certain features and components disclosed herein may be shown exaggerated in scale or in somewhat schematic form, and some details of conventional elements may not be shown in the interest of clarity and conciseness. In some of the figures, in order to improve clarity and conciseness of the figure, one or more components or aspects of a component may be omitted or may not have reference numerals identifying the features or components that are identified elsewhere. In addition, within the specification, including the drawings, like or identical reference numerals may be used to identify common or similar elements.

The terms "including" and "comprising" are used herein, including in the claims, in an open-ended fashion, and thus should be interpreted to mean "including, but not limited to . . . " Also, the term "couple" or "couples" means either an indirect or direct connection. Thus, if a first component couples or is coupled to a second component, the connection between the components may be through a direct engagement of the two components, or through an indirect connection that is accomplished via other intermediate components, devices and/or connections. In addition, if the connection transfers electrical power or signals, whether analog or digital, the coupling may comprise wires or a mode of wireless electromagnetic transmission, for example, radio frequency, microwave, optical, or another mode. So too, the coupling may comprise a magnetic coupling or any other mode of transfer known in the art, or the coupling may comprise a combination of any of these modes. The recitation "based on" means "based at least in part on." Therefore, if X is based on Y, X may be based on Y and any number of other factors.

In addition, as used herein, including the claims, the terms "axial" and "axially" generally mean along or parallel to a given axis, while the terms "radial" and "radially" generally mean perpendicular to the axis. For instance, an axial distance refers to a distance measured along or parallel to a given axis, and a radial distance means a distance measured perpendicular to the axis.

Furthermore, any reference to a relative direction or relative position in the description and the claims will be made for purpose of clarity, with examples including "top," "bottom," "up," "upward," "left," "leftward," "down," "lower," "clockwise," and the like. For example, a relative direction or a relative position of an object or feature may pertain to the orientation as shown in a figure or as described. If the object or feature were viewed from another orientation or were positioned differently, it may be appropriate to describe the direction or position using an alternate term.

The use of ordinal numbers (i.e. first, second, third, etc.) to identify one or more components within a possible group of multiple similar components is done for convenience and clarity. The ordinal numbers used in the detailed description for members of a particular group of components may not necessarily correspond to the ordinal numbers used in the claims when referring to various members of the same group of components.

Furthermore, in the disclosure, including the claims, the following definitions will apply. The term "scan" or "scanning" refers to the process whereby an image sensor detects, reads, or receives a signal from an identification symbol or an object, irrespective of whether or not a human participates in moving the sensor or an object to be scanned relative to each other. In some situations, for example, a human may move an identification symbol relative to the image sensor to initiate the scan.

As use herein, including the claims, the term "symbol" is used broadly to include markings, indicia, a physical configuration, or other readable or retrievable forms of data that may be present or may be coupled to an item of merchandise for identification or may be included on another piece of documentation (e.g., advertisement, coupon) about an item of merchandise. The symbol may not be distinguishable by sight, an example being the data or physical configuration of a radio frequency identification (RFID) tag.

DETAILED DESCRIPTION

Figure 1:
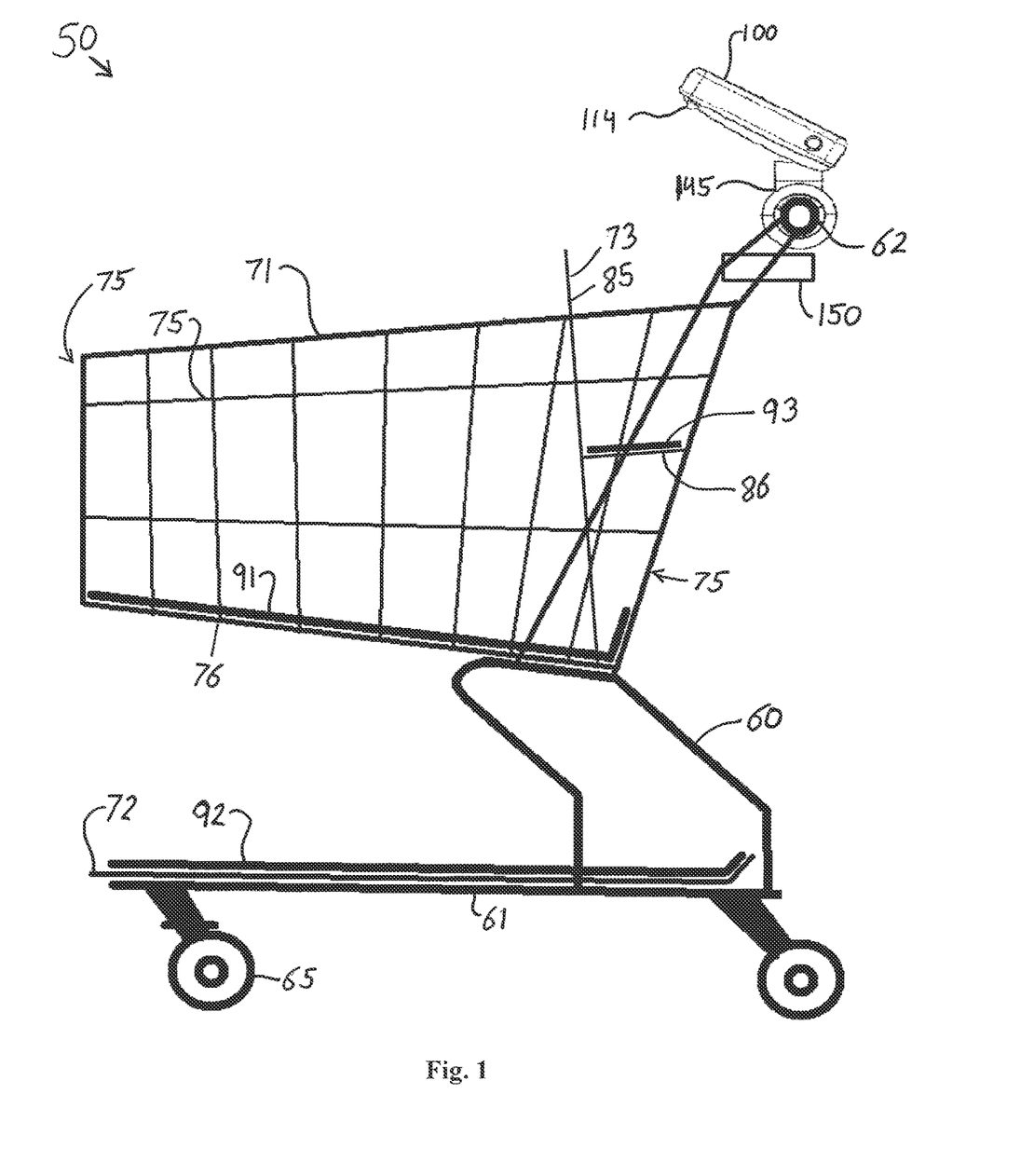
FIG. 1 shows a side view in schematic form of an embodiment of a consumer-operable shopping system in accordance with principles described herein.

FIG. 1 shows a consumer-operable shopping system 50 for enabling a shopping transaction to at a physical shopping location, which includes, for example a store, an outdoor market, or a sales floor at a convention event. Shopping system 50 is configured to allow a user to initiate a shopping transaction, to track the progress of the shopping transaction as the user gathers merchandise, and to complete the shopping transaction, including payment, without the user or the merchandise being required to go to a traditional check-out counter, station, or location for payment. The user may be a consumer who is not employed by the shopping location or may be an employee of the shopping location. The employee may shop for herself as the consumer or may shop on behalf of someone else or a business that is the consumer and needs assistance or has placed an order and may not be present at the shopping location. Shopping system 50 is configured for self-service shopping by a consumer. A shopping transaction for merchandise is said to be complete when payment has been made or credit has been arranged, and the consumer owns the merchandise or is otherwise legally entitled to remove the merchandise from the shopping location.

In the example of FIG. 1, consumer-operable shopping system 50 includes a plurality of portable shopping receptacles 71, 72, 73, which are configured to hold items of merchandise, and having a plurality of item detection sensors 91, 92, 93, each closely coupled to one the receptacles 71, 72, 73. The receptacles 71, 72, 73 together define an overall portable shopping support structure. In general, an item detection sensor is coupled to each portable shopping receptacle for movement through the shopping location and configured to detect physical presence of an item of merchandise when the item of merchandise is disposed in the coupled portable shopping receptacle. Shopping system 50 also includes a shopping scanner 100 and a printer 150, coupled to shopping receptacles 71, 72, 73 for movement through the shopping location. Shopping system 50 may also be called a shopping vehicle 50 or a shopping cart 50, referring to a physical shopping cart. For a shopping system as disclosed herein including the claims, the term "vehicle" is used broadly, and in various other embodiments, a shopping vehicle having a shopping receptacle may refer to a hand-held shopping basket or to a unit or vehicle configured with a seat to carry a person as well as a shopping receptacle, for example. The vehicle configured with a seat to carry a person refers to a wheelchair integrated with a shopping receptacle and, separately, a motorized vehicle integrated with a shopping receptacle for use by handicapped or disabled shoppers. Thus, the shopping receptacle is selected from a group comprising a portion of a shopping cart, a shopping basket, and a portion of a vehicle configured to transport a consumer while shopping.

Figure 2:
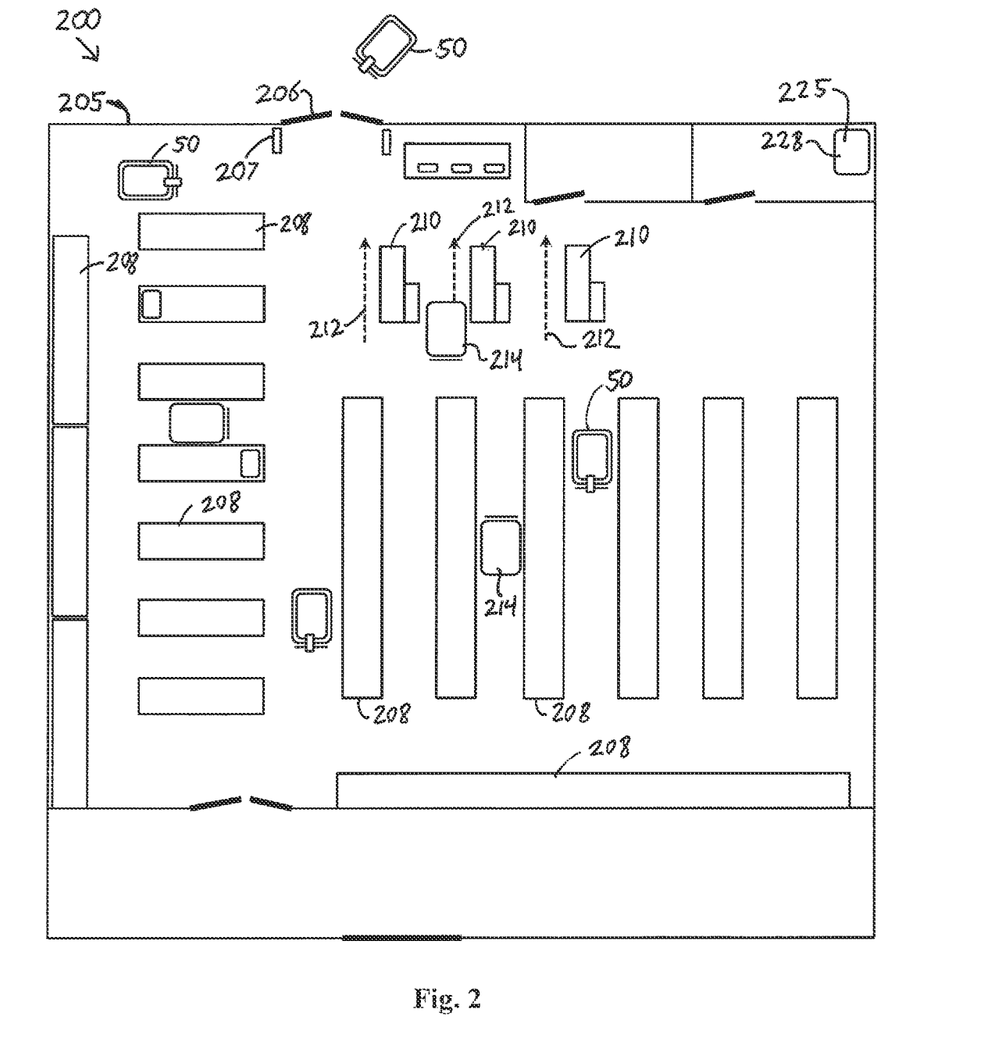
FIG. 2 shows an elevation view in schematic form of a shopping location having a location-implemented shopping system including the consumer-operable shopping system of FIG. 1 in accordance with principles described herein.

Referring now to FIG. 2, a location-implemented shopping system 200 is shown. Shopping system 200 includes a plurality of shopping vehicles 50 disposed at a physical shopping location 205, which in this instance is a grocery store. In various other instances, shopping location 205 is a shoe store, department store, a discount store, a combination grocery-discount store, a convenience store, an electronics store, another type of store, a farmer's market, an outdoor market, or a sales floor at a convention event, as examples. The structure of shopping location 205 may include a building, a room of a building, a parking lot, or a combination of these, for example. In FIG. 2, shopping location 205 includes an entrance 206, which serves as an both an entrance and exit, various display structures 208 for holding merchandise, check-out stations 210 each having, for example, a "cash box," a "cash register," or a computer device for completing a traditional shopping transaction at a prescribed location. In some instances, entrance 206 is a passageway with no door or is an automatic door, for example. A proximity sensor 207 at entrance 206 may be activated to provide a notification or to provide an audible, visible, or electronic warning alarm if a user attempts to exit through the entrance 206 with a shopping vehicles 50 before the user's shopping transaction is completed. Alternately, in some instances, proximity sensor 207 could force automatic completion of the shopping transaction as the user exits without sensor 207 activating an audible or visible warning. Upon exiting the building portion of the shopping location, the user may use shopping vehicles 50 to move the items of merchandise to a transportation vehicle in a parking lot associated with the shopping location, for example.

Some check-out stations 210 are operated by an employee and other are self-service, being operable by a consumer. Shopping location 205 also includes paths 212 for forming check-out lines adjacent each check-out station 210, a plurality of traditional shopping carts 214, and computer infrastructure 225, which includes a network server 228. In various instances, display structures 208 include shelves, refrigerated compartments, display cases, temporary display arrangements, clothing racks, movable pallets, bins, and the like. As a grocery store, shopping location 205 also includes weighing scales 215 positioned adjacent some of the display structures 208. Each weighing scale 215 is configured to weigh a selected amount of bulk merchandise received from a user and to indicate a merchandise identification symbol corresponding to the type of bulk merchandise and the total price of the selected amount. The indication provided by weighing scale 215 may also include the unit price and other information or parameters. The indication, including the merchandise identification symbol, provided by weighing scale 215 is either displayed on a screen or is printed on a label by weighing scale 215 and attached by the user to a container or bag holding the selected quantity of bulk merchandise. Shopping location 205 includes other features of a typical store, such as a customer service desk. In some embodiments using the principles of the present disclosure, shopping location 205 of shopping system 200 does not include traditional shopping carts 214, and in some embodiments using the principles of the present disclosure, a shopping location 205 does not include check-out stations 210 due to the ability of the presently disclosed consumer-operable shopping system to operate independently of check-out stations 210.

Figure 3:
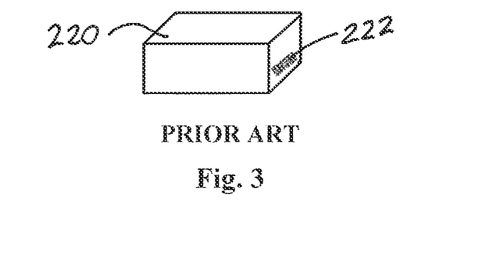
FIG. 3 shows a typical item of merchandise that may be purchased using the shopping system of FIG. 1.

FIG. 3 shows an example of a typical, packaged item of merchandise 220 that may be purchased at shopping location 205 using shopping vehicle 50. A merchandise identification symbol 222 is coupled to item 220 in any manner known in the art, including an adhesive label, direct printing on the packaging, direct printing on the item within the packaging, and a tag attached to item 220 by a tether, as examples. In FIG. 3, merchandise identification symbol 222 is a barcode, but in various other instances, another type of merchandise identification symbol is used, as will be explained. Other examples of item of merchandise that may be purchased using shopping vehicle 50 include an unpackaged item of merchandise having a merchandise identification symbol and a selected amount of bulk merchandise having an associated merchandise identification symbol. Some items of merchandise will have a plurality of merchandise identification symbols.

Referring again to FIG. 1, shopping vehicle 50 includes a frame 60 having a chassis 61 and a handle 62 with a plurality of wheels 65 (e.g. four wheels) coupled to the chassis 61. The first portable shopping receptacle 71 is coupled to frame 60 at a distance above chassis 61 and includes four sides 75 and a base 76. The second portable shopping receptacle 72 extends primarily horizontally and is positioned adjacent chassis 61, being disposed above, below, or extending both above and below chassis 61 in various embodiments. The third portable shopping receptacle 73 includes a front side 85 and a base 86 and shares some portion of various sides 75 with the first receptacle 71. The third receptacle is configured to hold either items of merchandise or a child and may be folded or collapsed.

In this embodiment, item detection sensors 91, 92, 93 are weight sensors. First weight sensor 91 is closely coupled to first receptacle 71, being disposed adjacent base 76, and supports the weight of objects that may be placed in receptacle 71. Second weight sensor 92 is closely coupled to second receptacle 72 and supports the weight of objects that may be placed in receptacle 72. Third weight sensor 93 is closely coupled to third receptacle 73, being disposed adjacent base 86 and supports the weight of objects that may be placed in receptacle 73. As shown, weight sensors 91, 92, 93 are placed within or on the corresponding receptacle 71, 72, 73, being supported by the receptacle 71, 72, 73. In other embodiments, a weight sensor 91, 92, 93 may be disposed between frame 60 and a receptacle 71, 72, 73, so that the weight sensor supports the corresponding receptacle. Although shopping system 50 is shown with three shopping receptacles 71, 72, 73 and three item detection sensors 91, 92, 93, various other embodiments of a shopping system include one, two, four, or another practical number of shopping receptacles and item detection sensors. Each weight sensor 91, 92, 93 is configured to detected, measure, and indicate the weight of an object or objects disposed in the corresponding portable shopping receptacle 71, 72, 73, i.e., is configured to weigh the object or objects. Each weight sensor 91, 92, 93 is configured not to weigh items of merchandise held by the others of the plurality of portable shopping receptacles 71, 72, 73. In other words, each receptacle and weight sensor combination 71/91, 72/92, and 73/93 is operable independently of the others in order to accurately weigh the total merchandise in the vehicle system 50 and thereafter interface with the rest of the vehicle system 50 to properly transfer transaction completion data.

Figure 4:
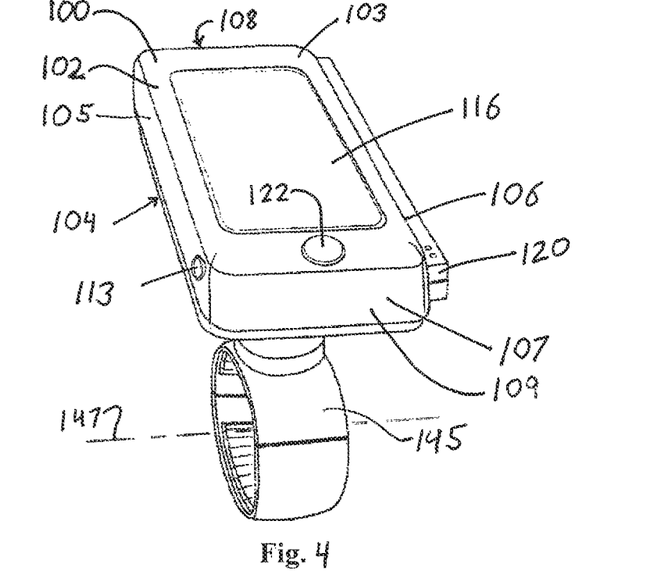
FIG. 4 shows a perspective front view of a shopping scanner of the consumer-operable shopping system of FIG. 1 coupled to a swivel mount in accordance with principles described herein.
Figure 5:
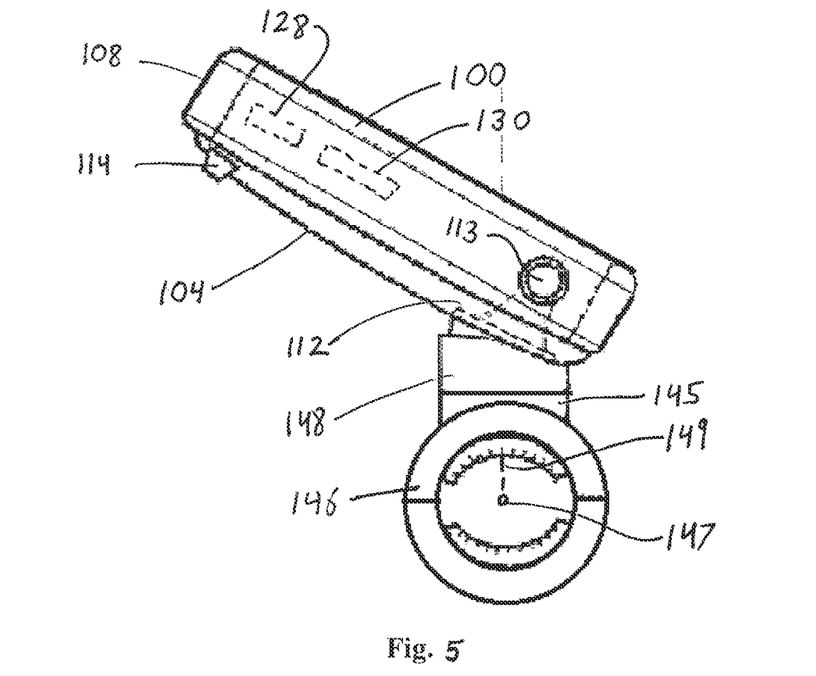
FIG. 5 shows a side view of the shopping scanner and swivel mount of FIG. 4.

Referring now to FIG. 4 and FIG. 5, shopping scanner 100 includes a body 102, a scanning sensor 114, a user interface 116, magnetic-strip card reader 120, a fingerprint reader 122, a location sensor 128, and a processor 130. Though referred to as a scanner, the device 100 may also properly be referred to as a computing device or an interface device. Body 102 includes a top 103, a bottom 104, a left side 105, a right side 106, a proximal end 107, a distal end 108, an outer case 109, and a docking feature 112 having a release button 113. Scanning sensor 114 is disposed or positioned adjacent the intersection of bottom 104 and distal end 108, generally facing toward shopping vehicle 50 and receptacle 71. Scanning sensor 114 is configured to read a merchandise identification symbol on an item of merchandise and may also be called a data reading sensor. In FIG. 1, scanning sensor 114 is a LASER scanner that includes the LASER transmitter, receiver, and circuitry similar to those of a hand-held, cordless scanner used at the check-out counters of some stores. In various embodiments, scanning sensor 114 is selected from a group of sensors including: a LASER scanner, an image sensor, a radio frequency identification (RFID) reader (which may include a capability to write to RFID tags), or another technology known in the art. Scanning sensor 114 is configured to scan (i.e., to read) a symbol selected from a group consisting of a barcode, a Quick Response (QR) code, a near field communication (NFC) tag, a passive or an active radio frequency identification (RFID) tag, and a symbol formed from an alpha-numeric characters (i.e. text), depending on the type of sensor 114 that is selected. An example of a barcode is a Universal Product Code (UPC) symbol. Scanning sensor 114 may be configured to read multiple of these types of merchandise identification symbols. Scanning sensor 114 is configured to read a symbol on a special-offer documentation, e.g., a printed store discount coupon, having a barcode, QR code, NFC tag, RFID tag, or a text symbol, for example.

User interface 116 includes a touch screen display capable of providing (i.e., displaying) data to and receiving data from a user as known in the art. As a touch screen display, user interface 116 may be configured with various images or data input methods that are automatically presented to the user depending on various stages of the shopping transaction. The data input methods may include a numeric keypad or a typing keyboard, cursor keys, for example. The data displayed may include specific information about an item of merchandise, information such as, price, cost per net weight, a stored image of the item, availability or location within the shopping location, availability at an associated shopping location, a price comparison between similar brands, or other data that may be useful to the user of shopping system 50. The stored image may show the item in any of various states that may pertain to the item, as examples: packaged, unpackaged, assembled, unassembled, raw, or cooked. User interface 116 may display a sales advertisement having several item of merchandise and links to additional information about those or related items. User interface 116 may be configured to display various data or messages for any of several reasons. For example, data may be displayed as a result of scanning sensor 114 scanning a merchandise identification symbol, as a result of the user entering a search request, or as a result of the location of the shopping system 50 within or outside the shopping location. User interface 116 is configured to provide a map showing the location of a selected item or to give directions for traveling to the selected item. In some embodiments, user interface 116 includes voice transmission or voice recognition capabilities. In some embodiments, user interface 116 includes a data jack, such as a universal serial bus (USB) jack, or includes a wireless interface, such as a BLUE TOOTH® interface, for exchanging data directly with a personally owned mobile computing device, such as a smart phone or a tablet computer. The camera of the personally owned mobile computing device may be used as the scanning sensor in such embodiments. In some embodiments, the user interface includes a physical keypad or a trackball and may include a display that is not a touch screen instead of a touch screen display.

Shopping scanner 100 is configured to process a form of customer identification selected from a group including: a credit card, a debit card, a mobile telephone, a shopping incentive membership card, a pre-paid purchase card issued for the shopping location (e.g., a gift card), a registered user name, a government issued identification (e.g., a driver's license, a food stamp card), or a fingerprint. Some forms of customer identification may be used as a method of payment for the shopping transaction, payment of services, or payment of damaged goods owned by the shopping location. For some transactions, more than one form of customer identification may be required. The capability of shopping scanner 100 to read these various forms of customer identification or payment are implemented by a device selected from the group of components that includes the scanning sensor 114, magnetic-strip card reader 120, user interface 116, or a fingerprint reader 122. For embodiments that include RFID reading capability, an RFID tag in an identification card, for example, may be used as the form of customer identification or payment. Some embodiments of a shopping scanner are configured to read customer identification or payment information from a smart card, such as a credit card having a smart card technology.

Shopping scanner 100 is releasably coupled to handle 62 of shopping vehicle 50 by a swivel mount 145. Mount 145 includes a cylindrical base 146 having a base axis 147 and includes a neck 148 extending from base 146 along a neck axis 149. Neck axis 149 is perpendicular to base axis 147. Other mounting components and arrangements are contemplated. Docking feature 112 of shopping scanner 100 engages the distal end of neck 148 and may be disengaged by release button 113. A coiled or retractable cord (not shown) couples shopping scanner 100 to neck 148 even after disengagement by release button 113. This cord allows the shopping scanner 100 to reach a bulky item of merchandise placed on lower receptacle 72 or to scan an item sitting on a shelf or display structure 208, for example. Though not shown because the scanner is in the retracted position on neck 148, the retractable cord is stored in an inner portion of one or both of scanner 100 and neck 148 such that it is expandable from the inner storage portion to allow the scanner to be extended beyond the mounted position as shown. The neck 148 and base 146 are configured with joints to allow shopping scanner 100 to be rotated or swiveled about either axis 147, 149 for ease of viewing or to achieve a better field of view for scanning sensor 114 to read a symbol. In some embodiments, neck 148 is configured to lengthen telescopically. In this manner shopping scanner 100 is configured for movement through the shopping location along with shopping vehicle 50, receptacles 71, 72, 73, and weight sensors 91, 92, 93.

In FIG. 5, location sensor 128 and processor 130 are disposed within body 102. Processor 130 is a typical computational processor and governs the operations of the several components of shopping scanner 100. Location sensor 128 is configured to receive global positioning satellite (GPS) signals, local positioning signals from the shopping location, or both GPS and local signals. Location sensor 128 is configured to provide location information about shopping vehicle 50 to processor 130 or processor 230 of network server 228 to guide the user while shopping and to reduce the potential for accidental loss or theft of shopping vehicle 50. In various embodiments, location sensor 128 may provide location information while the shopping vehicle 50 is disposed inside the walls of shopping location 205, disposed in the parking lot of shopping location 205, or is beyond the boundaries of shopping location 205.

Figure 6:
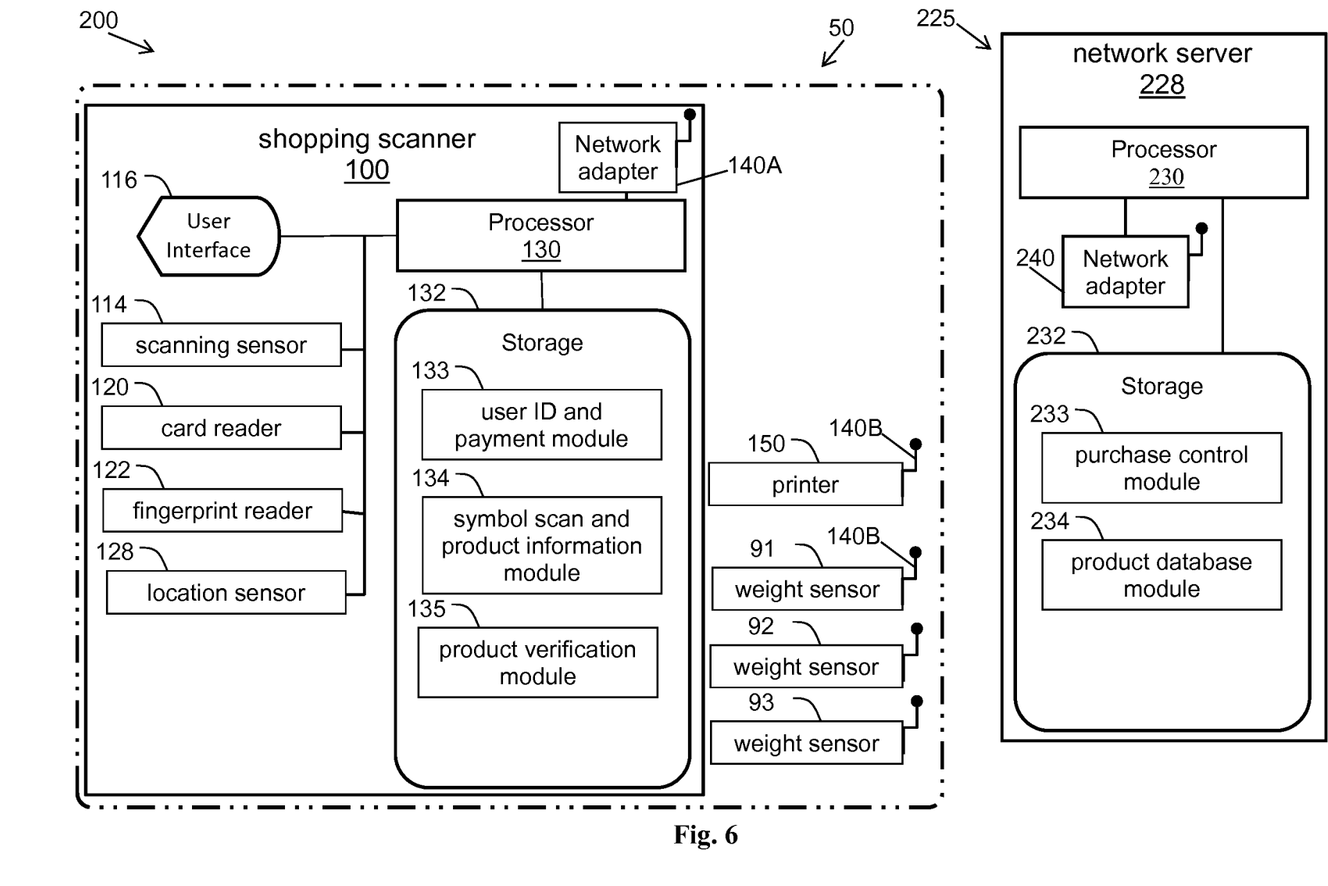
FIG. 6 shows a block diagram of the location-implemented shopping system including the consumer-operable shopping system of FIG. 1.

FIG. 6 shows a block diagram of location-implemented shopping system 200 including consumer-operable shopping system 50, i.e., shopping vehicle 50, and also network server 228 of computer infrastructure 225. Shopping system 200 is a computer-based system for enabling a shopping transaction to at a physical shopping location. Shopping system 200 is configured to allow a user to initiate a shopping transaction, track the progress of the shopping transaction as the user gathers merchandise, and complete the shopping transaction, including payment, without the user or the merchandise being required to go to a traditional check-out counter, station, or prescribed location for payment.

FIG. 6 shows that shopping scanner 100 of shopping vehicle 50 further includes a computer-readable storage 132 and a network adapter 140A, both components 132, 140A being coupled for data communication with processor 130. Network adapter 140A is configured to provide wireless communication between shopping scanner 100 and network server 228. User interface 116, scanning sensor 114, card reader 120, fingerprint reader 122, and location sensor 128 are also coupled for data communication with processor 130. Weight sensors 91, 92, 93 and printer 150 each include a network adapter 140B for wireless communication with shopping scanner 100 or network server 228. In various embodiments, network adapters 140A, 140B may be configured to communicate wirelessly with network server 228 or a more distant computer system while the shopping vehicle 50 is disposed inside the walls of shopping location 205, disposed in the parking lot of shopping location 205, or is beyond the boundaries of shopping location 205.

Network server 228, shown on the right-hand side of FIG. 6, includes a processor 230, computer-readable storage 232, and a network adapter 240, both components 232, 240 being coupled for data communication with processor 130. Network adapter 240 is configured to provide wireless communication with adapter 140A and, in at least some embodiments, communication with adapter 140B. Network adapter 240A is also capable of wireless or wired communication with other components (not shown) of computer infrastructure 225 or other computer systems beyond the confines of shopping location 205, for example a computer at a corporate office associated with shopping location 205 or other computers connected to the internet. In some embodiments, network server 228 is disposed at a location beyond the boundaries of shopping location 205.

The network adapters 140A, 140B, 240 may, for example, include circuitry that allows wireless communication via a WLAN (e.g., a WLAN according to an IEEE 802.11 standard), a WAN, such as a cellular communication network (long term evolution, global system for mobile communication, etc.), or other wireless network.

The processor 130 may be a general-purpose microprocessor, digital signal processor, microcontroller, or other device capable of executing instructions retrieved from a computer-readable storage medium. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems. Processor 130 may be implemented as a single processor or as a plurality of processors sharing tasks and data.

As understood by those of ordinary skill in the art, processors execute software instructions. Software instructions alone are incapable of performing a function. Therefore, in the present disclosure, any reference to a function performed by software instructions, or to software instructions performing a function is simply a shorthand means for stating that the function is performed by a processor executing the instructions.

Storage 132 is a non-transitory computer-readable storage medium suitable for storing instructions that, when executed by processor 130, cause processor 130 to perform a shopping transaction while exchanging information or instructions with network server 228. The storage 132 may include volatile storage such as random access memory, non-volatile storage (e.g., a hard drive, an optical storage device (e.g., CD or DVD), FLASH storage, read-only-memory), or combinations thereof.

Storage 132 includes a user identification and payment module 133 that includes instructions executable by processor 130 to perform some or all of these tasks: process customer identification; identify, process, or charge a method of payment for the shopping transaction (e.g. confirming a user account is active, and when appropriate, placing a charge against funds in that account), including when appropriate charging the method of payment based on the cost of the item; account for a special-offer documentation scanned by the scanning sensor; approve the shopping transaction after confirming that the customer identification meets pre-established criteria for purchasing a particular item of merchandise, such as an age-limited purchase like an alcoholic beverage or a or tobacco product; complete a shopping transaction; and provide confirmation of completion of the shopping transaction. The activities of completing a shopping transaction includes activities associated with processing or charging a method of payment. Confirmation of completion may be provided to the user in any of several methods, such as displaying on user interface 116, printing a paper receipt using printer 150, sending as a message to a smart phone or another type of mobile computing device selected by the user, sending as an e-mail. The instructions of user identification and payment module 133 configure shopping scanner 100 to complete a shopping transaction and provide confirmation of completion may be performed without requiring the shopping scanner 100 and the portable shopping receptacle 71, 72, 73 to travel to a check-out station 210 at a prescribed location within the shopping location (FIG. 2). A user will be able to avoid standing in paths 212 and avoid standing in check-out lines that may form along paths 212 (again, FIG. 2). In at least some instances, shopping vehicle 50 is configured to complete a shopping transaction at essentially any position in the shopping location that is accessible to the user and shopping vehicle 50.

Storage 132 includes a symbol scan and product information module 134 that includes instructions executable by processor 130 to perform some or all any of these tasks: cause the scanning sensor to acquire a scan of (i.e., to read) an identification symbol associated with an item of merchandise, determine the identity of the item and cost of the item based on the scan of the identification symbol; and communicate with processor 230 to gather information about an item of merchandise.

Storage 132 includes a product verification module 135 that includes instructions executable by processor 130 to receive from one of the weight sensors 91, 92, 93 indication of weight of an item of merchandise when the item is disposed in the corresponding portable shopping receptacle 71, 72, 73 and compare it to a known weight for the item. Thus, shopping scanner 100 is configured to receive from an item detection sensor an indication or confirmation of the physical presence of an item of merchandise in a portable shopping receptacle.

In conjunction with user identification and payment module 133, the product verification module 135 may also include instructions executable by processor 130 to keep weight sensors 91, 92, 93 active after completion of the shopping transaction while the shopping vehicle remains in the possession of the user. Eventually, processor 130 may deactivate the weight sensors or release the user's method of payment after one of the following events occurs: shopping receptacles 71, 72, 73 are emptied (requiring removal of at least 90% or removal of 99 to 100% of the total weight of merchandise, for example), shopping vehicle 50 is returned to or locked at a prescribed location, or a time limit expires. Therefore, if a user adds more items of merchandise or other things to a shopping receptacle 71, 72, 73 after processor 130 completes the shopping transaction, processor 130 takes the necessary steps to notify the user, notify the management of the shopping location via network server 228, or charge a cost to the user. Module 135 may also include instructions executable by processor 130 to provide notification or warning if someone adds items to a shopping vehicle before providing a form of identification or a method of payment or if a cart is removed from the shopping location with or without unpaid merchandise. For example, for this purpose, weight sensors 91, 92, 93 may be configured to remain continuously active and in communication with shopping scanner 100 as long as electrical power (e.g., battery power) is available to the weight sensors in order to monitor the placement of things, including items of merchandise into a shopping receptacle 71, 72, 73.

For a shopping transaction, shopping vehicle 50 is configured to process and transport one, two, three, or any practical number of items of merchandise in any or several of the receptacles 71, 72, 73, up to the weight and volume capacity of receptacles 71, 72, 73 and of vehicle 50 as a whole. Processor 130 executes appropriate instructions from storage 132 each time a merchandise identification (ID) symbol is presented to shopping scanner 100 or an item of merchandise is placed in a receptacle 71, 72, 73. If an ID symbol is read for a first item of merchandise and the first item is not placed in a receptacle 71, 72, 73 within a selectable period of time or prior to second item of merchandise being scanned, an inquiry may be sent to user interface 116 for cancelation of the first item or information about the item may be automatically withheld from the log of the shopping transaction, with the expectation that the user chose not to purchase the first item. Scanning sensor is configured to allow a user to remove an object from a receptacle 71, 72, 73 and scan it with scanning sensor 114 to remove it from the list of items being purchased. Confirmation may be required via user interface 116. The weight indicated or measured by weight sensors 91, 92, 93 is observed by processor 130 to insure a reduction, and this reduction in weight is compared against a known value to insure the item was removed from shopping vehicle 50.

Referring again to network server 228 shown in FIG. 6, processor 230 shares some or all of the characteristics described for processor 130. Processor 230 may be implemented as a single processor or as a plurality of processors sharing tasks and data. Storage 232 is a non-transitory computer-readable storage medium suitable for storing instructions that, when executed by processor 230, cause processor 230 to assist processor 130 in performing a shopping transaction and may cause processor 230 to perform other tasks related to the needs of shopping location 205. The storage 232 may include volatile storage such as random access memory, non-volatile storage (e.g., a hard drive, an optical storage device (e.g., CD or DVD), FLASH storage, read-only-memory), or combinations thereof.

Storage 232 includes a purchase control module 233 that includes instructions executable by processor 230 to assist or govern the tasks of user identification and payment module 133 that may be executed by processor 130.

Storage 232 includes a product database module 234 that includes instructions executable by processor 230 to assist or govern the tasks of the symbol scan and product information module 134 that may be executed by processor 130. The database module 234 may be a relational database, an object oriented database, etc. The database 108 includes database software that is executed by the computer to process and store merchandise information and user information. In some embodiments, database module 234 is implemented on a computer separate from network server 228 and that computer may be a location remote from shopping location 205.

The database module 234 includes stored information about a plurality of vendible items of merchandise for shopping location 205. For each item, the information includes some or all of the following: a merchandise identification code associated with a corresponding merchandise identification symbol, the name of the item, the brand name associated with the item, a description of the item, expected total weight, net weight, physical dimensions, an image, a cost, a cost per unit of net weight, location (e.g., the number of the shelf or other display structure 208 and location along the shelf, GPS coordinates, or directions for travel from a selected base-point in the shopping location), a listing or data links for similar competitive products, and a listing of or data links for complementary products, as examples. An example of a merchandise identification code associated with a corresponding merchandise identification symbol is the UPC number associated with a UPC barcode. In another example, the UPC number instead of the barcode is read by scanner 100, and so the merchandise identification code in database 234 is the same as the merchandise identification symbol. Database module 234 may include inventory quantities and inventory control information for merchandise of shopping location 205.

In various embodiments, some of the instructions within modules 133, 134, 135 of storage 132 are instead held within storage 232, or some of the instructions within modules 233, 234, 335 of storage 232 are instead held within storage 132. Similarly, some of the tasks of processor 130 are instead performed by processor 230, and some of the tasks of processor 230 are instead performed by processor 130.

Instructions in the modules of storage 132 or storage 232, when executed by the respective processor 130, 230, cause the processor to perform some or all of these tasks for each item of merchandise selected by the user, positioned to be scanned by scanner 100, and placed in a receptacle 71, 72, 73: determine an identity by correlating the merchandise identification symbols with a merchandise identification code stored in the database 234; retrieve cost information or other information corresponding to the determined merchandise identification code; using data from a weight sensor 91, 92, 93, perform a comparison of the measured weight of the selected item of merchandise against the expected weight of the corresponding member of the plurality of items of merchandise in database 234; and confirm the identity determined for the selected item of merchandise based on the comparison. This process may be performed for a plurality of selected items of merchandise placed in the same or in various receptacles 71, 72, 73. The ability to indicate or distinguish individual measured weights for each of a plurality of selected items of merchandise in a single receptacle is discussed below.

The order in which any of the instructions or tasks for processors 130, 230 were listed does not necessarily indicate an order in which the instructions or tasks are intended to be performed. Although FIG. 6 shows one shopping vehicle 50 configured to communicate with network server 228. In general, network server 228 is configured to communicate with a plurality of shopping vehicles 50 simultaneously, as shown in FIG. 2.

Referring to FIG. 1 and FIG. 6, each weight sensor 91, 92, 93 is configured to detected, measure, and indicate the weight of an object or objects disposed in in the corresponding portable shopping receptacle 71, 72, 73. During a normal mode of operation of shopping system 50, 200, the indication provided by each weight sensor 91, 92, 93 includes a transmission of weight data (analog or digital) to another component of shopping system 50, which is configured to receive weight information from the plurality of weight sensors, for example processor 130 of shopping scanner 100 or printer 150. The object detected may be an item of merchandise, another object from the store, or a personally owned possession (e.g., a purse or a jacket). Shopping system 50, 200 may account for the weight of a personally owned possession or of a child when initiating a shopping transaction so the possession or child may be placed in a shopping receptacle 71, 72, 73 without confusing the weights of merchandise that are selected, placed, and measured. Placement of a child may be limited to receptacle 73.

As an example of operation, when a first item of merchandise (not shown) is placed in receptacle 72, the weight sensor 92 detects, measures, and indicates the weight of that first item, including its net weight and the weight of its packaging when an item of merchandise includes packaging. When a second item of merchandise (not shown) is also placed in receptacle 72, the weight sensor 92 measures and indicates the total weight of the first and second items. If multiple items are simultaneously placed in the receptacle, the additional combined weight of those multiple items is added to the total weight of all items of merchandise disposed in receptacle 72. In some embodiments, weight sensor 92, performs logical or mathematical operations to distinguish and indicate the individual measured weights of the first and the second items and of other sequentially placed items, in addition to or instead of the total weight of all items of merchandise disposed in receptacle 72. In these embodiments, weight sensors 91, 93 are configured to perform the same function for items of merchandise placed in receptacles 71, 73, respectively. Thus, the additional weight of each item of merchandise placed in one of the portable shopping receptacles 71, 72, 73 may be detected, measured, and indicated by the corresponding weight sensor 91, 92, 93. In some embodiments, this distinguishing of individual measured weights for each of a plurality of items of merchandise is performed by processor 130 or processor 230.

Shopping vehicle 50 is configured to allow a first mode of operation in which the user scans the item using shopping scanner 100 before placing the item in a receptacle 71, 72, 73 and to allow a second mode of operation in which the user places the item in a receptacle 71, 72, 73 before scanning the item using shopping scanner 100. These first and second modes of operation may be used interchangeably during a shopping transaction. If the second mode is chosen, shopping scanner 100 may indicate or display a request for the user to scan the item and may send a warning to network server 228 if the user does not scan the item in a prescribed period of time to protect against shoplifting, i.e., not paying for all items in shopping vehicle 50.

Figure 7:
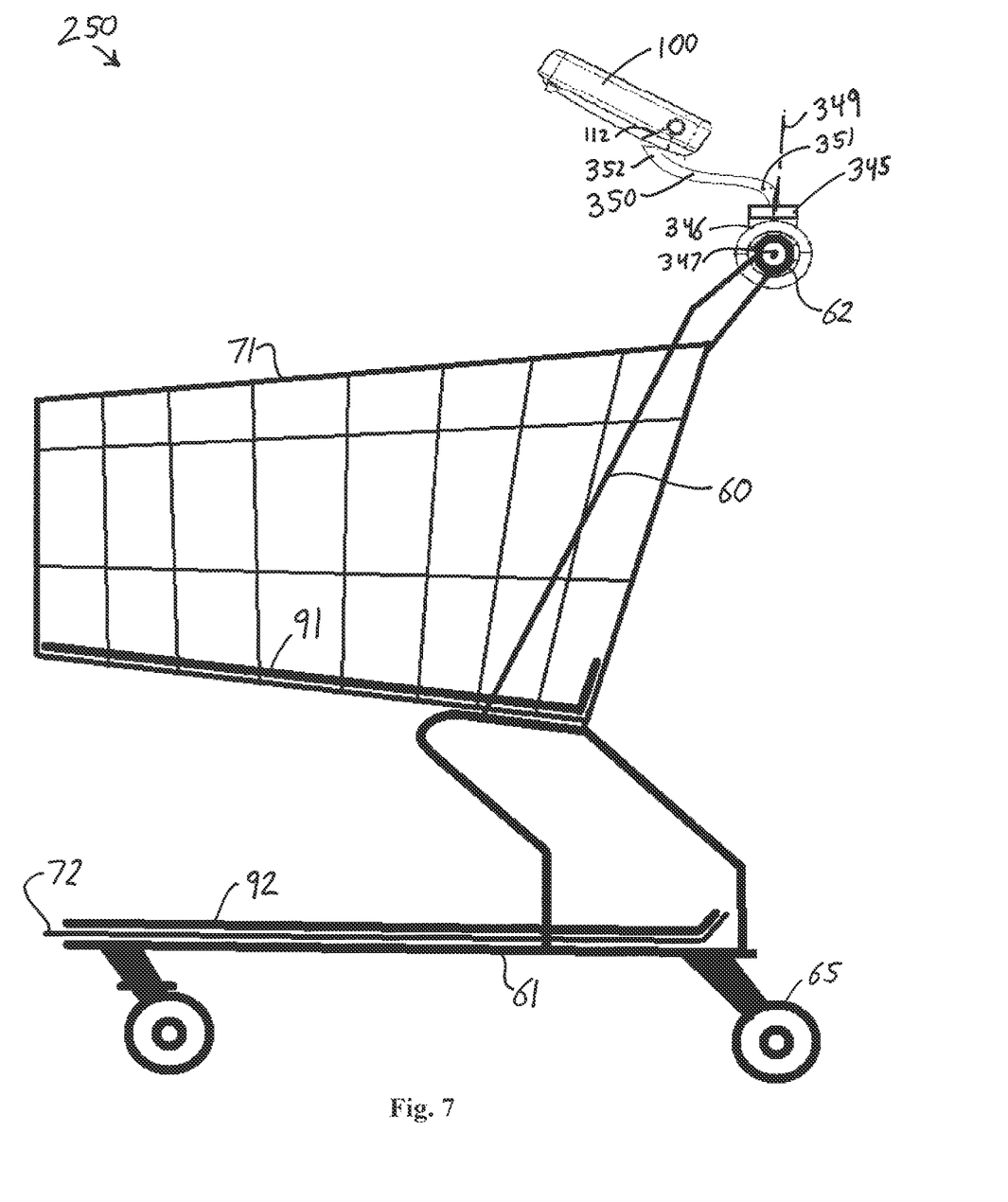
FIG. 7 shows a side view of an embodiment of a consumer-operable shopping system having a shopping scanner flexibly mounted in accordance with principles described herein.

The side view of FIG. 7 presents another embodiment of a consumer-operable shopping system for enabling a shopping transaction to at a physical shopping location. Consumer-operable shopping system 250 is configured to allow a user to perform all aspects of a shopping transaction, including completing the shopping transaction, without the user or the merchandise being required to go to a traditional check-out counter for payment. Shopping system 250 is similar to system 50 of FIG. 1, shopping system 250 having a plurality of item detection sensors each sensor closely coupled one of a plurality of portable shopping receptacles for movement through the shopping location and configured to detect physical presence of an item of merchandise when the item of merchandise is disposed in the coupled portable shopping receptacle. Shopping system 250 is configured to operate within location-implemented shopping system 200 along with shopping system 50 or in place of shopping system 50.

Shopping system 250 includes two portable shopping receptacles 71, 72 and two item detection sensors 91, 92, which are weight sensors 91, 92. Receptacles are mounted to a frame 60 having a chassis 61 and a handle 62 with wheels 65 mounted below chassis 61. Shopping system 250 may also be called a shopping vehicle 250 or a shopping cart 250. Like system 50, shopping system 250 includes a shopping scanner 100, which was previously described and was shown in FIG. 1, FIG. 4, and FIG. 5. The shopping scanner 100 is flexibly coupled to a portable shopping receptacle for articulated movement relative to the receptacle. More specifically for this embodiment, shopping scanner 100 is mounted to handle 62 by a flexible mount 345. Flexible mount 345 includes a cylindrical base 346 clamped around handle 62 and having a base axis 347 extending within handle 62. Flexible mount 345 includes a flexible, articulated neck 348 extending from base 346 at a second axis 349, which is perpendicular to base axis 147. A proximal end 351 of articulated neck 348 is attached to base 346 at second axis 349, and a distal end 352 is configured to engage docking feature 112 of shopping scanner 100. Distal end 352 is movable away from second axis 349. Flexible mount 345 allows shopping scanner 100 to move, changing orientation or position with respect to the portable shopping receptacles 71, 72.

Figure 8:
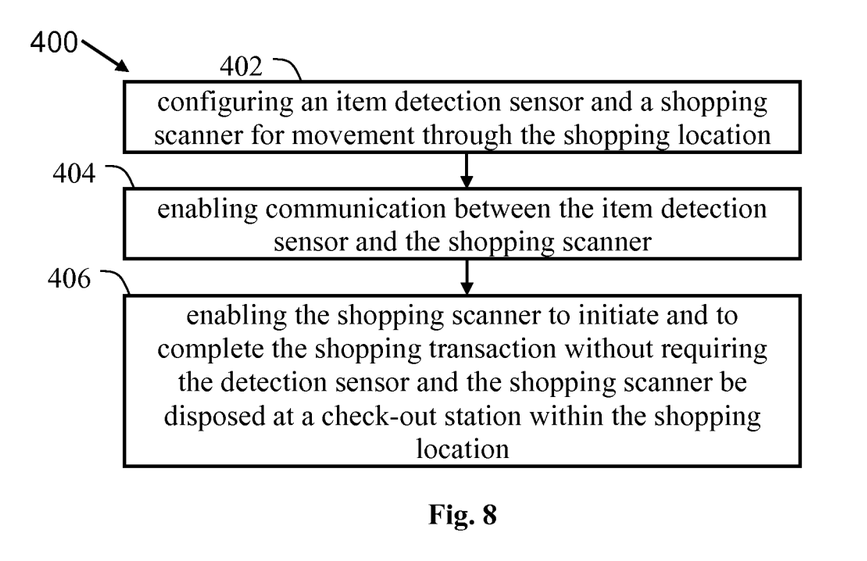
FIG. 8 shows a flow diagram showing a method for implementing the location-implemented shopping system of FIG. 2 in accordance with principles disclosed herein.

FIG. 8 shows a method 400 for processing a shopping transaction at a shopping location in accordance with the principles described herein. At block 402, method 400 includes configuring an item detection sensor and a shopping scanner for movement through the shopping location. Block 404 includes enabling communication between the item detection sensor and the shopping scanner. Block 406 includes enabling the shopping scanner to initiate and to complete the shopping transaction without requiring the detection sensor and the shopping scanner be disposed at a check-out station within the shopping location. As examples, the operations of method 400 may be performed by any of the shopping systems 50, 200, 250.

Various embodiments of method 400 may include fewer operations than described. Various other embodiments of method 400 include additional operations based on any of the concepts presented in this specification, including the figures. In some instances, an operational or scheduling advantage is gained by choosing specific sequences for various operations of method 400. For example, a consumer approaches the shopping system and physically interfaces with the portable vehicle to traverse the shopping location. Items are added to the portable vehicle. The items electronically interface with the portable vehicle of the shopping system and a transaction record is initiated and updated in the shopping system. When desired, the consumer can electronically interface with the shopping system at the portable vehicle to complete the transaction. Thus, the entire shopping transaction is enabled by a self-contained consumer interface point, i.e., the portable vehicle of the shopping system. Consequently, the shopping transaction can be completed wholly independent of or free from a prescribed check-out location. The consumer's path at the shopping location can be minimized to only those movements necessary to collect and leave with the items of merchandise because the consumer's physical and electronic interfaces are contained in the shopping vehicle, and the transaction can be completed while traversing only that shopping path.

Examples of various embodiments of a shopping system have been presented, e.g., shopping vehicles 50, 205 and system 200 as well as some derivatives thereof. Some additional variations are described next.

In various embodiments a shopping system, including shopping vehicles 50, 205 and system 200 in accordance with the principles described herein, is configured to enable a shopping transaction to occur as a user visits a plurality of separately owned, adjacent shopping locations that are capable of sharing or parsing sales information for the shopping transaction.

Some embodiments of a shopping system may be configured to read a plurality of merchandise identification symbols on a single item of merchandise in order to verify the merchandise being placed in or removed from a portable shopping receptacle. For example, a first merchandise identification symbol may be read by a scanning sensor, and the second merchandise identification symbol may be an RFID tag read by an RFID tag reader or an RFID tag reader and writer. Some RFID tags include two status states. In the first status state, the RFID tag indicates that the item to which it is attached has not been purchased. While the tag is in first status state, the tag may cause a proximity sensor 207 at a door to alarm if a person attempts to leave the shopping location, thereby reducing the potential for shoplifting. In the second state, the RFID tag indicates that the item has been purchase or that the item has been added to a purchase listed that will be paid when a shopping transaction is eventually completed. Some embodiments of a shopping system or shopping scanner that have a capability to read and write to RFID tags include the capability to transition an RFID tag between the first state and the second state.

In some embodiments of shopping system, the item detection sensor is an infrared (IR) scanner coupled to a shopping receptacle to detect placement of objects, including items of merchandise, within the shopping receptacle. The IR sensor may be configured, for example, to detect movement of objects, including items of merchandise, as the objects pass through an opening in a shopping receptacle, for example.

Some embodiments of a shopping vehicle have a weight sensor configured to monitor items placed in any of the one or more shopping receptacles of the shopping vehicle. The weight sensor may be mounted between the wheels and the chassis, for example.

Although consumer-operable shopping system 50, which is also called shopping vehicle 50, was shown as having separate network adapters 140 for each weight sensor 91, 92, 93, and printer 150 (FIG. 6), some embodiments of a shopping system or shopping vehicle include a combined network adapter mounted to frame 60, for example, that includes data interface cables interconnecting the weight sensors and printer. The combined network adapter is configured to communicate wirelessly with network adapter 240 of network server 228 and with shopping scanner 100. Optionally, a data interface cable may couple the combined network adapter and a port on the shopping scanner. In some of these embodiments, a personally owned mobile computing device having camera may be used in place of shopping scanner 100. The personally owned mobile computing device may include shopping software downloaded from computer infrastructure 225 or from another accessible computer associated with the shopping location. The shopping software enables mobile computing device to perform many or all of the functions of shopping scanner 100, including communicating for data exchange with the combined network adapter and network adapter 240 of network server 228. Consequently, shopping scanner 100 may be removed, deactivated, or ignored in some instances.

Some embodiments include a power distribution assembly having an electrical box with a common battery pack, a transformer, and a single connector for charging the battery from an alternating current power source. Multiple power cables interconnect the battery pack with the various components (object detection sensors, printer on shopping vehicle 50. In some embodiments, a printer is integrated into a shopping scanner instead of being mounted as a separate component.

While exemplary embodiments have been shown and described, modifications thereof can be made by one of ordinary skill in the art without departing from the scope or teachings herein. The embodiments described herein are exemplary only and are not limiting. For example, certain embodiments may include various combinations of the features from more than one of the described embodiments. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. The inclusion of any particular method step or operation within the written description or a figure does not necessarily indicate that the particular step or operation is necessary to the method. The steps or operations listed in a description of a method or in a method claim may be performed in any order, except for those particular steps or operations, if any, for which a sequence is expressly stated. In some implementations two or more of the method steps or operations may be performed in parallel, rather than serially.

What is claimed is:

1. A shopping system for enabling a shopping transaction at a shopping location, the shopping system comprising:
   a first portable shopping receptacle;
   a shopping scanner coupled to the first portable shopping receptacle for movement through the shopping location and configured to read a merchandise identification symbol associated with an item of merchandise, to process a method of payment for the shopping transaction, to complete a shopping transaction and to provide confirmation of completion of the shopping transaction, the shopping scanner comprising:
      a first mode of operation and a second mode of operation;
      a body;
      a scanning sensor disposed in or on the body;
      a user interface disposed in or on the body; and
      a processor disposed in or on the body and coupled for data communication with the scanning sensor and the user interface; and
   an item detection sensor coupled to the first portable shopping receptacle for movement through the shopping location and configured to detect physical presence of the item of merchandise when the item of merchandise is disposed in the first portable shopping receptacle;
   wherein the shopping scanner is further configured to receive indication of the physical presence of the item of merchandise in the first portable shopping receptacle from the item detection sensor; and wherein, when the shopping scanner is in the second mode of operation, the item detection sensor detects the physical presence of the item of merchandise before the scanning sensor reads the merchandise identification symbol.

2. The shopping system of claim 1 wherein the shopping scanner is configured to use the scanning sensor to read a symbol on a special-offer documentation; and wherein the shopping scanner is configured to reduce the cost of the shopping transaction based on the special-offer documentation.

3. The shopping system of claim 1 wherein the shopping scanner further comprises a magnetic-strip card reader;
wherein the shopping scanner is configured to process a customer identification by utilizing the scanning sensor;
wherein the shopping scanner is configured to process a customer identification by utilizing the magnetic-strip card reader;
wherein the shopping scanner is configured to process a customer identification by utilizing the user interface.

4. The shopping system of claim 1 wherein the shopping scanner is configured to process a form of customer identification selected from a group consisting of a credit card, a debit card, a mobile telephone, a shopping incentive membership card, a user name, and a smart card; and wherein the shopping scanner is configured to process a form of customer identification selected from a group consisting of a government issued identification and a fingerprint.

5. The shopping system of claim 1 wherein the scanning sensor is selected from a group consisting of: an image sensor, a LASER scanner, and a radio frequency identification (RFID) reader.

6. The shopping system of claim 1 wherein the shopping scanner is configured to read a symbol selected from a group consisting of the following types of merchandise identification symbols: a barcode, a Quick Response (QR) code a near field communication (NFC) tag; a radio frequency identification (RFID) tag, and an alpha-numeric symbol.

7. The shopping system of claim 1 wherein the item detection sensor is a first weight sensor configured to weigh the item of merchandise.

8. The shopping system of claim 7 further comprising a first axis and a second axis perpendicular to the first axis, both axes fixed relative to the portable shopping receptacle;
wherein the shopping scanner is coupled for movement about the first axis and about the second axis enabling the shopping scanner to change orientation or position with respect to the portable shopping receptacle.

9. The shopping system of claim 7 further comprising:
a plurality of portable shopping receptacles, including the first portable shopping receptacle, coupled together for movement through the shopping location; and
a plurality of weight sensors, including the first weight sensor;
wherein each of the portable shopping receptacles has at least one of the weight sensors closely coupled for movement through the shopping location and configured to weigh one or more items of merchandise disposed in the portable shopping receptacle; and
wherein the shopping scanner is configured to receive weight information about the one or more items of merchandise disposed in the plurality of portable shopping receptacles from the plurality of weight sensors.

10. The shopping system of claim 9 wherein each of the plurality of weight sensors is configured not to weigh items of merchandise held by the others of the plurality of portable shopping receptacles.

11. The shopping system of claim 1 wherein the portable shopping receptacle is selected from a group comprising a portion of a shopping basket and a portion of a vehicle configured to transport a consumer while shopping.

12. A shopping system for enabling a shopping transaction for a consumer at a shopping location, the shopping system comprising:
a portable shopping receptacle;
a weight sensor coupled to the portable shopping receptacle for movement through the shopping location and configured to detect weight associated with an item of merchandise disposed in the first portable shopping receptacle;
a shopping scanner configured for movement through a shopping location and comprising:
a first mode of operation and a second mode of operation, wherein in the second mode of operation, the weight sensor detects the weight associated with at least one of a first measurement of weight and a second measurement of weight before the shopping scanner reads at least one of a first merchandise identification symbol and a second merchandise identification symbol;
a body;
a scanning sensor disposed in or on the body; and
a user interface disposed in or on the body; and
one or more processors coupled for data communication with the scanning sensor, the user interface, and the weight sensor; and
instructions that, when executed by the one or more processors, cause the one or more processors to:
cause the scanning sensor to acquire a scan of the first merchandise identification symbol for a first item of merchandise of the shopping transaction;
receive indication of the first measurement of weight from the weight sensor;
cause the scanning sensor to acquire a scan of the second merchandise identification symbol for a second item of merchandise of the shopping transaction;
receive indication of the second measurement of weight from the weight sensor;
determine a cost of each of the first and second items of merchandise based on the first merchandise identification symbol and the second merchandise identification symbol;
process a method of payment for the shopping transaction; and
complete the shopping transaction without requiring the portable shopping receptacle to travel to a checkout station within the shopping location.

13. The shopping system of claim 12 wherein the instructions, when executed by the one or more processors, cause the one or more processor to:
account for a special-offer documentation scanned by the scanning sensor; and
provide confirmation of completion of the shopping transaction to the consumer.

14. The shopping system of claim 12 wherein the instructions, when executed by the one or more processors, cause the one or more processors to
process customer identification selected from a group consisting of a credit card, a debit card, a mobile telephone, a shopping incentive membership card, a user name, a government issued identification, a smart card, and a fingerprint;
complete the shopping transaction after confirming the customer identification meets pre-established criteria for purchasing the first item of merchandise; and
wherein the first item of merchandise is an alcoholic beverage or a tobacco product, requiring the customer to have attained a prescribed age.

15. The shopping system of claim 12 further comprising:
a database of information about a plurality of items of merchandise, including the first and second items of merchandise;
wherein the information about for each member of the plurality of items, includes a merchandise identification code associated with a corresponding merchandise identification symbol, a cost, and an expected weight;
wherein the instructions, when executed by the one or more processors, cause the one or more processor to:
 determine an identity for each of the first and second items by correlating each of the first and second merchandise identification symbols with a merchandise identification code stored for a corresponding member of the plurality of items in the database;
 retrieve cost information corresponding to the determined merchandise identification code for each of the first and second items.

16. The shopping system of claim 15 wherein the instructions, when executed by the one or more processors, cause the one or more processor to:
 determine an individual measured weight of the first item of merchandise and an individual measured weight of the second item of merchandise based on the first and second measurements of weight from the weight sensor;
 perform a first comparison of the individual measured weight of the first item of merchandise against the expected weight of the corresponding member of the plurality of items of merchandise;
 perform a second comparison of the individual measured weight of the second item of merchandise against the expected weight of the corresponding member of the plurality of items of merchandise;
 confirm the identities determined for the first and second items of merchandise based on the first and second comparisons.

17. A method for processing a shopping transaction at a shopping location, the method comprising:
 configuring an item detection sensor and a shopping scanner for movement together through the shopping location, the shopping scanner comprising:
  a first mode of operation and a second mode of operation, wherein the second mode of operation includes detecting by the item detection sensor a physical presence of an item of merchandise before the shopping scanner reads a merchandise identification symbol;
  a body;
  a scanning sensor disposed in or on the body;
  a user interface disposed in or on the body; and
  a processor disposed in or on the body and coupled for data communication with the scanning sensor, the user interface;
 enabling data communication between the item detection sensor and the shopping scanner;
 enabling the shopping scanner to initiate and to complete the shopping transaction without requiring the detection sensor and the shopping scanner to be disposed at a check-out station within the shopping location.

18. The method of claim 17 further comprising:
coupling the detection sensor and the shopping scanner to a portable shopping receptacle for movement through the shopping location; and
providing confirmation of completion of the shopping transaction;
wherein initiating and completing the shopping transaction includes
 identify a method of payment;
 acquire a scan of an identification symbol associated with the item of merchandise;
 assessing an indication from the item detection sensor to determine whether or not the item of merchandise is disposed adjacent the detection sensor;
 determine identity of the item and cost of the item based on the scan of the identification symbol; and
 charge the method of payment based on the cost of the item.

19. The method of claim 17 wherein the scan of the identification symbol includes an electronic message derived from the identification symbol or energy reflected or generated by the identification symbol.

20. The method of claim 17 further comprising:
enabling the shopping scanner to charge the method of payment and to provide confirmation of completion without requiring the shopping scanner and the portable shopping receptacle travel to a check-out station of the shopping location.

21. The method of claim 17 further comprising:
reading customer identification from at least one member selected from a group consisting of: a credit card, a debit card, a mobile telephone, a shopping incentive membership card, or a smart card;
reading customer identification from at least one member selected from a group consisting of: a government issued identification or a fingerprint.

22. The method of claim 21 further comprising:
approving the shopping transaction after confirming the customer identification meets pre-established criteria for the item of merchandise;
wherein the item of merchandise is an alcoholic beverage or a tobacco product.

23. The method of claim 17 further including:
enabling communication between the shopping scanner and computer infrastructure; and
enabling a comparison of the customer identification with a stored data set of potential customers accessible by the computer infrastructure.

24. The method of claim 17 further including:
measuring weight of the item of merchandise when the item is disposed in the portable shopping receptacle;
validating the identity of the item of merchandise by comparing the measured weight to a known weight of the item of merchandise.

25. The method of claim 17 further including:
enabling the shopping scanner further to:
 receive scans of a plurality of identification symbols, each identification symbol associated with one of a plurality of items of merchandise;
 receive confirmation from the item detection sensor when each item of merchandise of the plurality of items is disposed in the portable shopping receptacle;
 display a items-to-be-purchased list of the plurality of items of merchandise for an end-user to review; and remove a selected item from the items-to-be-purchased list.

26. A shopping system for enabling a shopping transaction at a shopping location, the shopping system comprising:
an item detection sensor configured for movement through the shopping location;
a shopping scanner configured to acquire a radio frequency identification (RFID) signal from a radio frequency identification (RFID) tag and configured for movement together with the item detection sensor, the shopping scanner comprising:
a body;
a radio frequency identification (RFID) reader disposed in or on the body; and
a user interface disposed in or on the body;
one or more processors coupled for data communication with the radio frequency identification (RFID) reader and the item detection sensor; and
instructions that, when executed by the one or more processors, cause the one or more processors to:
cause the radio frequency identification (RFID) reader to acquire the radio frequency identification (RFID) signal from the radio frequency identification (RFID) tag in a first state coupled to a selected item of merchandise for the shopping transaction;
receive indication of the physical presence of the selected item of merchandise from the item detection sensor;
determine identity of the item and cost of the selected item of merchandise based on the radio frequency identification (RFID) signal;
transition the radio frequency identification (RFID) tag to a second state;
process payment information for the shopping transaction; and
complete the shopping transaction.

27. The shopping system of claim 26 further comprising:
a database of merchandise information for a plurality of items of merchandise for a shopping location;
wherein for each vendible item, the merchandise information includes a merchandise name, a merchandise identification code, a merchandise physical characteristic, and a potential location of the merchandise within the shopping location;
wherein the instructions, when executed by the one or more processors, cause the one or more processor to:
correlate the selected item of merchandise with corresponding member of the plurality of items of merchandise; and
Present on the user interface the merchandise information for the corresponding member.

28. The shopping system of claim 27 further comprising a portable shopping receptacle;
wherein the item detection sensor is a weight sensor coupled to the portable shopping receptacle;
wherein the merchandise physical characteristic includes a weight of each vendible item;
wherein the item detection sensor is configured to indicate the weight of the selected item of merchandise when the selected item of merchandise is present in the portable shopping receptacle.

29. The shopping system of claim 26 further comprising:
a portable shopping receptacle coupled to the item detection sensor for movement together through the shopping location;
wherein the item detection sensor is configured to indicate the physical presence of the selected item of merchandise when the selected item of merchandise is present in the portable shopping receptacle.

30. The shopping system of claim 26 wherein the instructions, when executed by the one or more processors, cause the one or more processor to:
Account for a special-offer documentation scanned by a scanning sensor.

31. The shopping system of claim 26, wherein the shopping scanner includes scanning sensor and at least one of the one or more processors.

32. The shopping system of claim 1 further comprising:
a second portable shopping receptacle configured as a seat to hold a child and is coupled to the first portable shopping receptacle for movement through the shopping location; and
a second weight sensor closely coupled to the second portable shopping receptacle and configured to weigh the contents of the second portable shopping receptacle;
wherein the shopping scanner is configured to account for the weight of a child or a personally owned possession disposed in the second portable shopping receptacle during a shopping transaction.

33. The shopping system of claim 12 wherein the shopping scanner further includes a magnetic-strip card reader; and
wherein the shopping scanner is flexibly coupled to the portable shopping receptacle for articulated movement relative to the portable shopping receptacle.

* * * * *